June 11, 1929.　　O. W. KNIGHT ET AL　　1,717,226
ADVERTISING APPARATUS
Filed March 9, 1926　　5 Sheets-Sheet 1

WITNESSES

INVENTORS,
O. W. KNIGHT,
J. B. WESLEY,
BY
ATTORNEYS

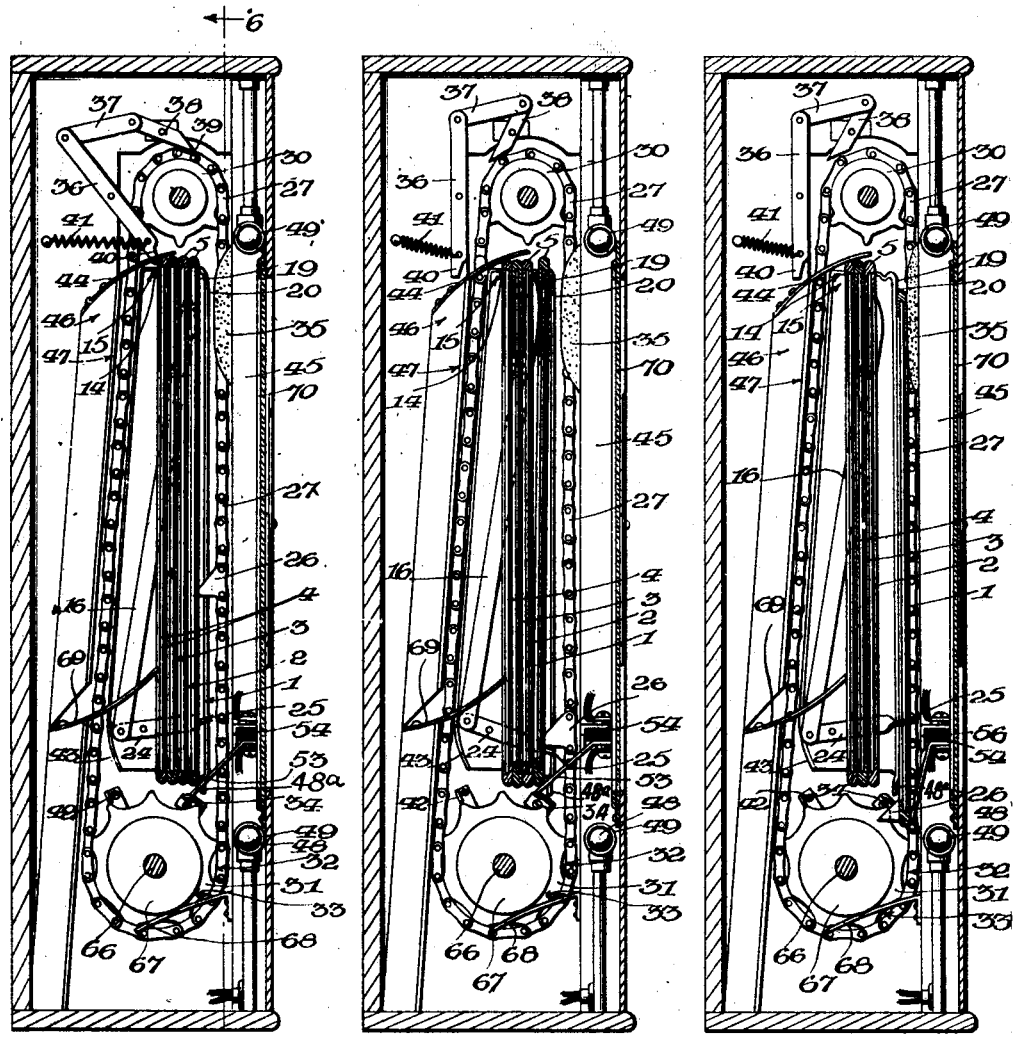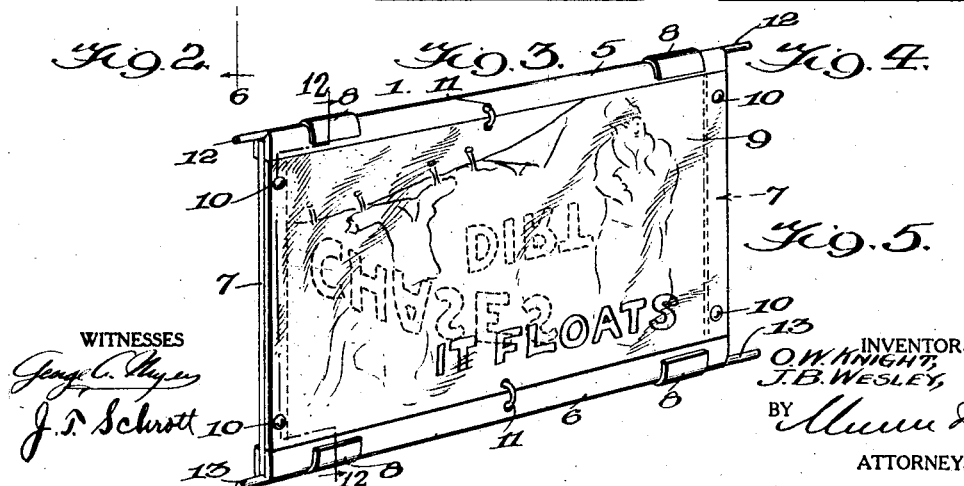

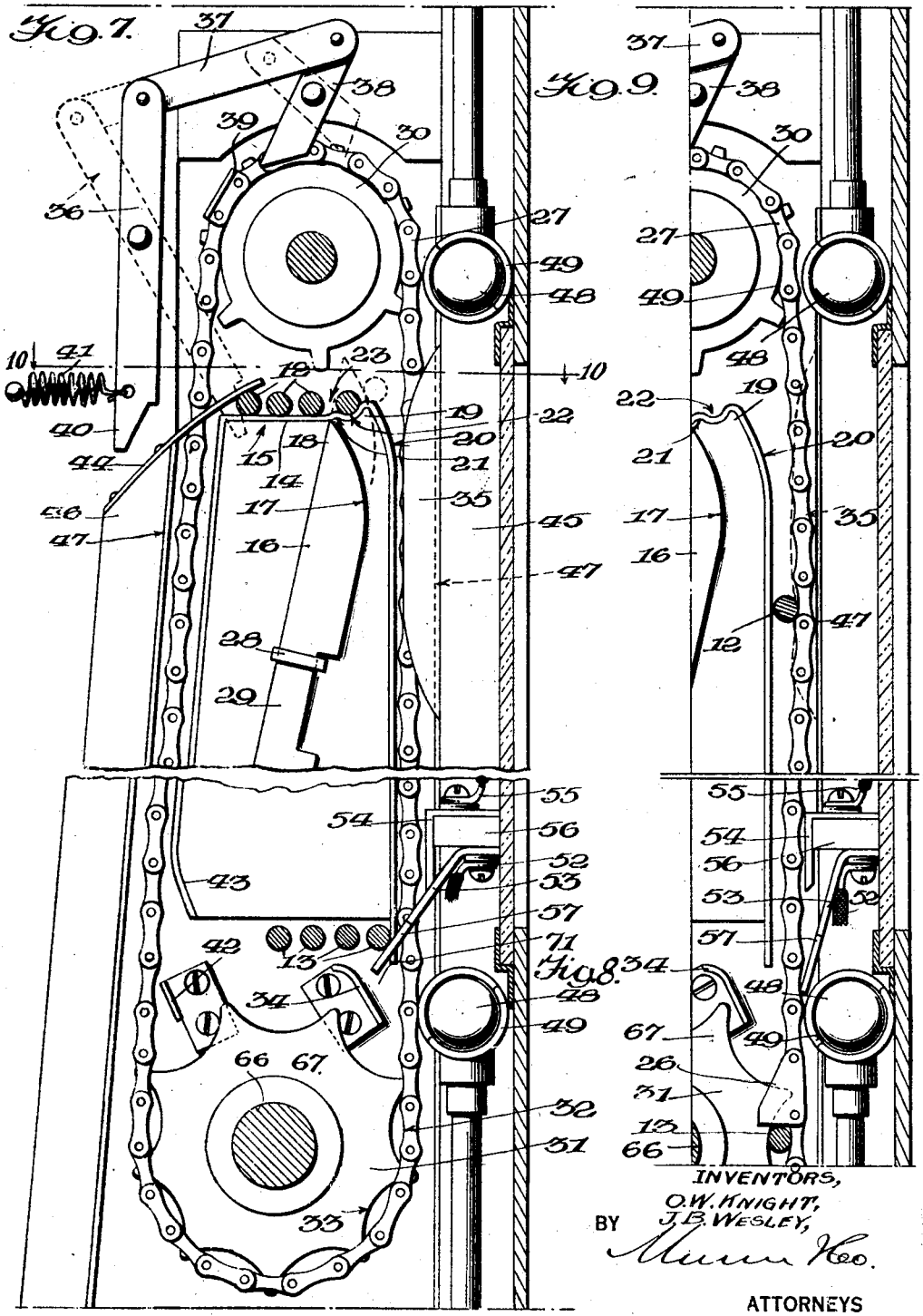

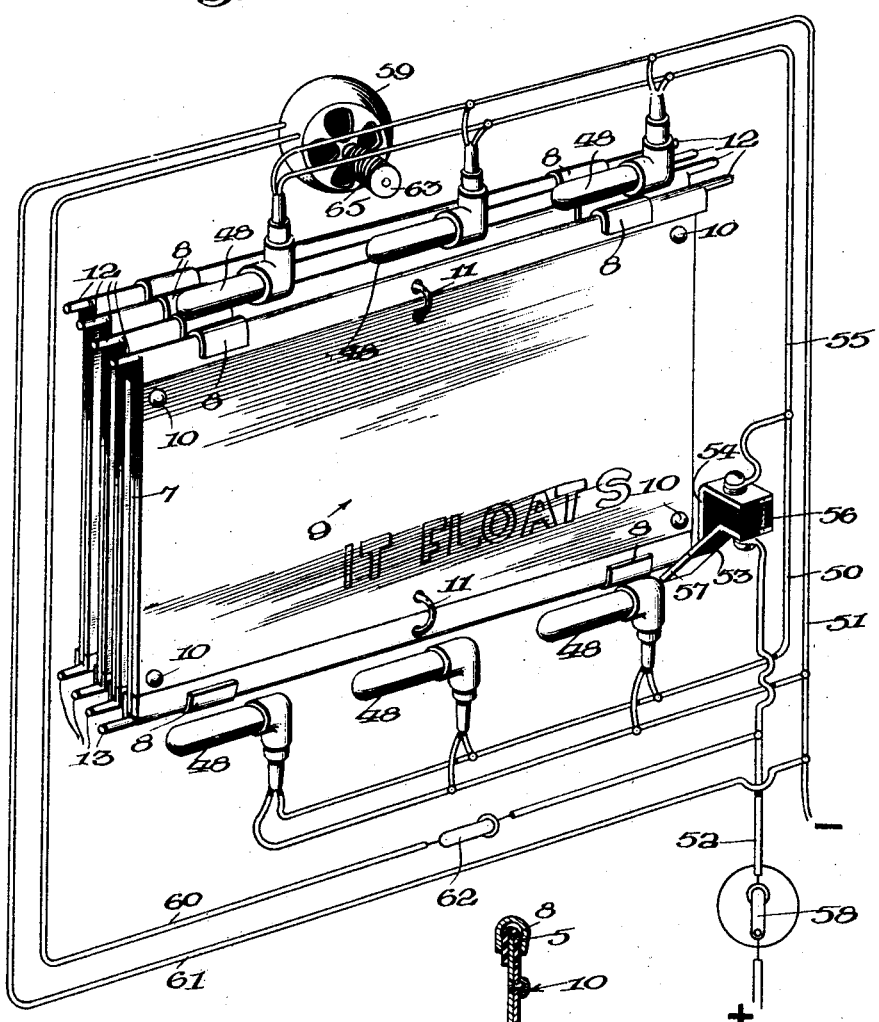

Patented June 11, 1929.

1,717,226

UNITED STATES PATENT OFFICE.

OLLIE W. KNIGHT AND JOSEPH B. WESLEY, OF HAMMOND, LOUISIANA.

ADVERTISING APPARATUS.

Application filed March 9, 1926. Serial No. 93,544.

This invention relates to improvements in advertising apparatuses, and it consists of the constructions, combinations and arrangements herein described and claimed.

An object of the invention is to provide an advertising apparatus which in part comprises a number of panels or frames which are disposed one behind the other and which carry the advertising matter, there being means for periodically transporting the foremost frame to the rear so as to display the sign next in order, an associated electric light circuit being under such control of the foremost frame that the light is turned off during the period of transportation, and turned on when the next succeeding frame is in full view.

Other objects and advantages appear in the following specification, reference being had to the accompanying drawings in which Figure 1 is a perspective view illustrating the general appearance of the apparatus, Figure 2 is a vertical section taken substantially on the line 2—2 of Figure 1, the presser lug and lever being shown in the act of moving or pressing the frames to the front, Figure 3 is a similar sectional view illustrating the initial act of the lifter plunger in displacing the foremost frame from the frame support.

Figure 4 is a similar sectional view illustrating how the lifter lug initiates the act of transporting the foremost frame to the rear.

Figure 5 is a detail perspective view of one of the frames, illustrating a typical mode of applying the advertising matter or sign.

Figure 7 is a detail sectional view taken substantially on the line 7—7 of Figure 6, clearly showing how the upper pin ends of the frames rest upon the frame support.

Figure 8 is a detail sectional view taken substantially on the line 8—8 of Figure 6, clearly illustrating details referred to later on.

Figure 9 is a detail sectional view illustrating the foremost frame in the act of transportation to the rear.

Figure 11 is a diagrammatic perspective view intended to more particularly illustrate the lighting and motor circuits.

Figure 12 is a detail cross section on the line 12—12 of Figure 5 illustrating how the canvas (upon which the sign is painted) may be attached to the flexible side straps of the frame by means of conventional snap fasteners.

Figure 1:
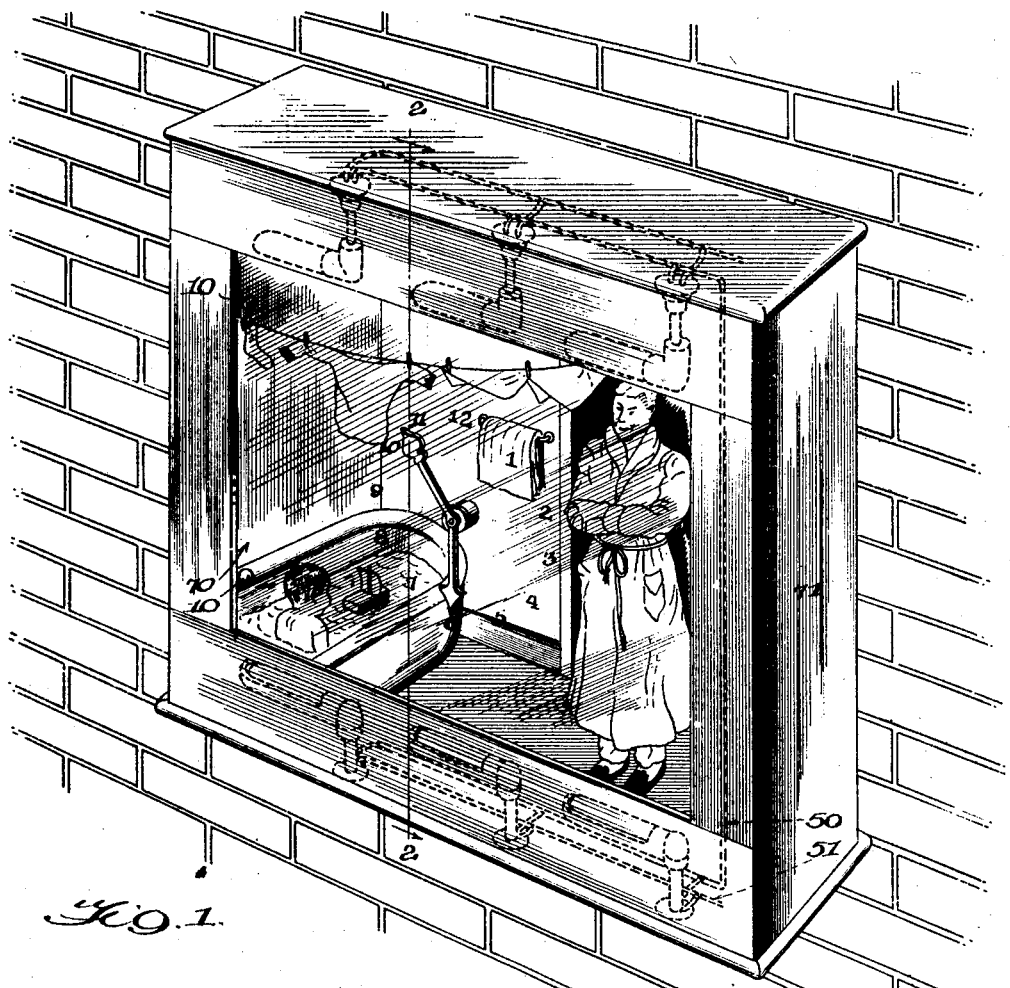
Figure 10:
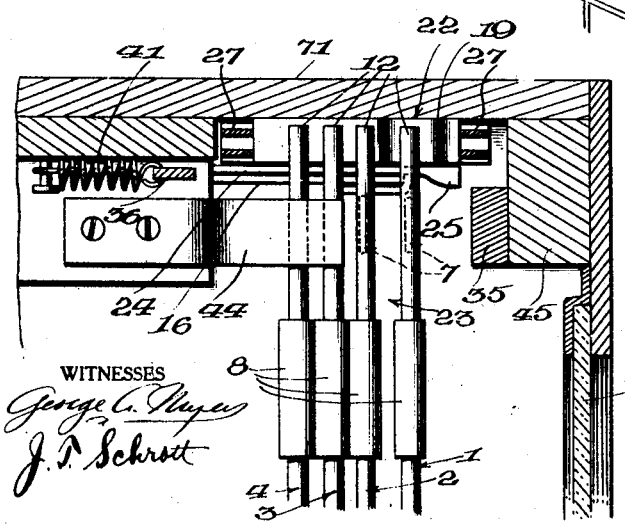
Figure 10 is a detail horizontal section taken substantially on the line 10—10 of Figure 7.

In carrying out the invention provision is made of a plurality of advertising frames, these being rectangularly by preference and of the general appearance of the frame in Figure 5. The advertising apparatus is subject to wide variations in size, the fundamental principle being applicable to an apparatus designed for store window advertising as well as to a very large apparatus designed for outdoor advertising.

The drawings illustrate the use of four advertising frames generally designated 1, 2, 3 and 4, but the reader will presently understand that more or less frames may be employed. The description of the frame 1 will suffice for all, and reference is made to Fig. 5.

Metallic strips 5 and 6 define the upper and lower borders of the frame. These are bent into U-shape, Fig. 12, to receive the extremities of flexible straps 7 which define the side borders of the frame. Clips 8 are so applied to the metallic strips that the edges of the latter are pressed toward each other, thereby serving to grip the ends of the straps. The side straps are flexible, as stated, and to this end they may be composed of spring steel, leather or other material suitable for the purpose. The advertising sign is painted, printed or otherwise applied to a canvas or other flexible sheet 9.

Snap fasteners 10, such as are customarily seen on gloves, may be employed for the purpose of affixing the flexible sheet 9 to the flexible side straps 7 (see also Figure 12). If the frame be exceptionally large it may be found necessary to support the flexible sheet in the middle as well as at the ends and in such event use may be made of rings 11 or the like to secure the upper and lower edges of the sheet to adjacent parts of the metallic strips. It must be understood that the foregoing mode of assembling the frame elements and the flexible sheet is merely typical of the various modes that may be employed, the purpose being to so attach the side straps to the metallic strips and the flexible sheet 9 to the resulting frame in such a manner that the parts will hold together during transportation from front to rear of the apparatus cabinet.

Pins 12 and 13 are formed at the extremities of the metallic strips 5 and 6, these being known as the upper and lower pin ends by virtue of the position that they assume in the cabinet prior to the transportation of the frames from front to rear. The upper pin ends 12 of the frame 1 (as well as corresponding ends of the remaining frames) rest upon the metallic sheathing 14 of lateral frame supports 15 within the cabinet. The frame support is referred to in the plural term but the majority of the drawings (see Figs. 2, 3, 4, 7, 9 and 10) show only the support at one end of the cabinet. The reader must bear in mind that all of the mechanism in the following description as relates to transporting the foremost frame from front to rear, for pressing the frames forwardly and for displacing the foremost frame from the lateral supports is duplicated at each end of the cabinet. This can be partially verified in Fig. 6.

Displacement of the foremost frame 1 from the frame support 15 is accomplished by the lifter plunger 16. The upper end of the plunger is beveled at 17 so that it comes to a point at 18. The bevel constitutes a cam which when the plunger 16 moves from the full line to the dotted line position in Figure 7, carries the upper pin end 12 upward and over the lug 19 in readiness to ride down the incline 20.

A slightly raised place 21 in the seathing 14 of the support 15 provides a complementary lug, the two lugs defining a recess 22 in which the pin end of the forward frame is caught and reclines when the frames are pressed forwardly by pressure lever 36 as hereinbefore explained. The foremost frame is thus made to occupy a position best suited for the subsequent function of the plunger 16, it being necessary that the plunger shall move upwardly in a line behind the pin end 12 in order to displace the foremost frame as stated. As soon as the foregoing pressing function has been accomplished, there is a slight tendency of the frame to relax. The pin ends of the foremost frame are caught in the recesses 22, and the tendency of the frames to relax results in a slightly increased space at 23 between the pin ends of the foremost frame and of the frame next succeeding, thereby insuring ample room for the entrance of the point 18.

The lower end of the plunger 16 is pivoted to one end of the lever 24 (Figs. 2, 3 and 4). The lever, in turn, is pivoted upon the lower portion of the support 15. The support 15 stands out from the interior surface of the adjacent ends of the cabinet (see Fig. 10) and is not to be confused with the cabinet end itself. The free extremity of the lever 24 is twisted 90° or otherwise appropriately shaped at 25 for the engagement by the lifter lug 26 on the endless sprocket chain 27. Engagement of the lug 26 with the end 25 rocks the lever 24 and moves the plunger 16 upwardly (Figs. 3 and 7) to displace the foremost frame from the support 15. A yoke 28 so fits around the reduced portion 29 of the plunger as to limit the movements of the plunger and at the same time maintain the upper end in proper position. The reduced portion provides shoulders which are engageable with one leg of the yoke.

Upper and lower sprockets 30 and 31 carry the chain 27. The inner edges of the chain links are concaved at 32. The lower sprocket 31 has pronounced concaves 33. These complementary concavities form pockets in which the lower pin ends 13 are firmly gripped for the transportation of the foremost frame from front to rear. The upper pin ends 12 of the frame undergoing transportation is held between a corresponding concavity of one of the chain links and the adjacent upright portion of the sheathing 14 (Fig. 9) thereby causing the entire frame to move around with the chain. The engagement of the upper pin ends 12 between the chain and sheathing 14 constitutes the sole support for the upper border of the frame during transportation.

Transportation of the foremost frame begins when the upper pin ends 12 have been dislodged from the recesses 22. The lifter lug 26 reaches and comes into engagement with the adjacent lower pin end 13 as soon as it releases the end 25 of the lever 24.

A fixed deflector 34 (Fig. 8) guides the lower pin end 13 toward the chain and sprocket where it is temporarily pocketed. But the lug 26 continues downward pressure upon the lower pin end and continues such pressure until release ultimately occurs on the rear side. The upper border of the released frame is not permitted to fall idly but is immediately given the support of a friction strip 35 which occupies such position as to rub against the adjacent side strap 7.

That frictional support of the strip 35 continues until the pocketing of the upper and lower ends 12 and 13 of the frame respectively between the chain and sheathing 14 in one instance and between the concavities 32 and 33 of the chain and lower sprocket in the other instance is fully established. The friction strip 35 terminates at what is regarded as an appropriate place, and the displaced frame is then carried to the rear alone. The friction strip may be composed of rubber, fabric, a composition of both or any other suitable material.

Pressing forward of the frames occurs each time that a foremost frame is transported from front to rear and reaches its ultimate position upon the support 15 at the rear of the series. This act is accomplished by a presser lever 36 which has connection through a link 37 with the pivoted trip 38. The free end of the trip occupies a position in the path of the presser lug 39. This lug is carried by the chain 27 and when it engages the trip 38 causes rocking of the trip and lever to the full line position in Figure 2 and dotted line position in Figure 7 so that the heel 40 engages the rearmost frame and shoves forwardly upon all of them. This act moves the frames as close together as may be, and causes pin ends 12 of the foremost frame to enter the recesses 22 as already described. Upon passage of the lug 39 a spring 41, attached to the free end of the lever 36, pulls the presser parts back to the original position.

The chain 27 carries only the two lugs 26 and 39, and from the foregoing description the reader will understand that the function of the first is entirely different and independent from the function of the second. Reverting for a moment to the time when the lower pin end 13 is still pocketed between the concavities 32 and 33 of the chain and lower sprocket: As soon as the pin end departs from the pocket which ultimately opens it engages a second fixed deflector 42, the purpose of which is to keep the pin end 13 in place upon the lifter lug 26 which has followed the pin end around and henceforth carries the frame into its ultimate position of rest upon the support 15. The pin end 13 promptly engages the incline 43 of the sheathing 14 which incline serves to direct the pin into its track where it is pocketed between a chain concavity and the adjacent sheathing 14.

As soon as the pin end 13 reaches the level top of the support 15 a leaf spring or other spring 44 which permanently bears against the rearmost frame directs the arriving frame forwardly upon its support. It is preferable to make the element 44 flexible, and a leaf spring is therefore employed. The flexibility of the element 44 provides for any yielding that might be necessary, and although the element 44 presses upon the rearmost frame the function thereof is not to press the frames forwardly because that is the function of the presser lever 36. The spring 44 merely follows up.

Mention was recently made of the pocketing of the pin end 13 in its track. The chain 27 travels in spaces defined by the upright edges of the support 15 and adjacent cleats 45 and 46. The confronting surfaces of the elements mentioned are faced with metal. The metallic sheathing 14 has already been referred to, and the surfaces of the cleats 45 and 46 are similarly sheathed at 47. The result of the arrangement may well be called a track because it is in the space referred to that the pin ends 12 and 13 travel during transportation of the foremost frame from front to rear. The sheathing 14 may be a continous piece, extending from the incline 43 around to the lowermost edge at the opposite side of the support 15, that end of the sheathing projecting downwardly at 48$^a$, serving as a guard for the lower pin end and at the same time deflecting the pin end downwardly at the proper time.

Reference is again made to Figure 5. Both sides of the flexible sheet 9 are intended to carry advertisements. but inasmuch as each frame becomes inverted at the end of its transportation from front to rear, the advertisement on the reverse side must be applied in reverse order to the advertisement on the front. This is clearly pictured in Figure 5. The reader will also understand that the pins 12 which at one time are known as the upper pin ends, become the lower pin ends when the frame has been transported.

Illumination of the foremost advertisement is under the automatic control of the foremost frame. The cabinet is equipped with a plurality of lamps 48 (Fig. 11) near the top and bottom. These lamps have reflectors 49 (not shown in Fig. 11) which direct the light upon the flexible sheet 9.

The lighting circuit comprises the positive and negative wires 50 and 51 with which the lamps are connected in parallel.

A positive feed wire 52 connects with the movable contact 53 of a switch. This contact engages a fixed contact 54. This contact has a connection at 55 with the wire 50, and since the switch is connected with the positive side of the line, the wire 50 in turn is positive. Contacts are carried by a suitably mounted insulating block 56, and it would be preferable to insulate the extremity of the movable contact 53 as shown at 57. The lighting circuit is normally closed (assuming that the main switch 58 is closed) thereby lighting the lamps 48 and illuminating the exposed advertisement. But as soon as the foremost frame is displaced and the lowermost pin end 13 moves downwardly, the movable contact 53 is pressed out of engagement with the contact 54 and is held in that position by the adjacent side straps 7 of the frame until the upper border of that frame passes around to the rear.

The lighting circuit is thus automatically opened when a change of signs occurs, and remains open to keep the apparatus dark until the frame next succeeding is fully revealed. The release of the contact 53 by the upper border of the frame mentioned permits the automatic switch to again close and light the lamps so that the advertisement next succeeding is illuminated.

Figure 6:
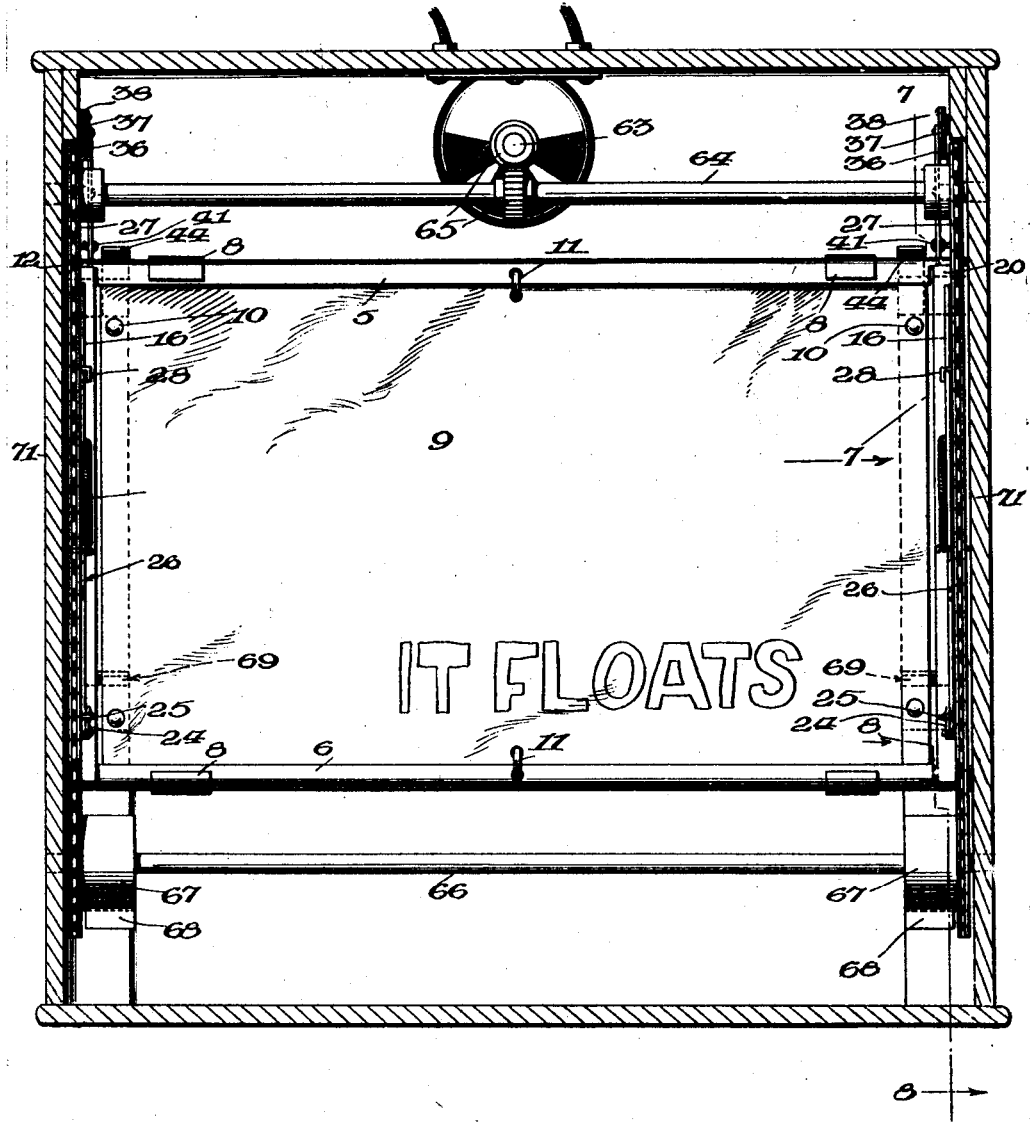
Figure 6 is a vertical section taken substantially on the line 6—6 of Figure 2.

Current for the operation of an electric motor 59 is derived from the main wires 52 and 51 by way of branch wires 60 and 61. These constitute the motor circuit and one of the wires has a switch 62 by means of which the motor is capable of independent control. The motor shaft 63 drives the upper sprocket shaft 64 by worm gear connections 65 (Fig. 6). The motor is supposed to operate continuously, but the lamps 48 flash on intermittently.

The shaft 66 of the lower sprockets 31 carries rollers 67 which may or may not be rubber faced. Springs 68, appropriately carried by the front cleats 45, bear upwardly against the surfaces of these rollers. The rollers and springs occupy the positions in registration with the side straps 7 of the frames, and the purpose thereof is to assist in guiding the frames around during transportation from front to rear. The rear cleats 46 carry other leaf springs 69 (Figs. 2, 3 and 4) in such positions as to press forwardly upon the lower ends of the frames to keep them out of the way of a particular frame undergoing transportation and at the same time prevent them from swinging loosely. The springs 69 press the lowermost ends of the frames toward the projection 48ª, the lowermost pin ends 13 engaging such projection.

Reference has been made to a cabinet. The cabinet contains all of the foregoing mechanism. It is intended to be made of metal, wood or any other suitable material. It has a glass front 70 (Fig. 1) through which the advertisements are seen. The cabinet ends 71 carry the advertising frame supports, for example the support 15 in Fig. 7. The reader will remember the statement regarding the duplication of mechanism at each end of the cabinet. The cabinet is supported upon a wall (Fig. 1) or otherwise, depending on where it is used. Although no bearings for the upper and lower shafts 64 and 66 are shown (other than merely projecting the ends of the respective shafts into the casing ends as in dotted lines in Fig 6) it must be understood that in practice appropriate bearings will be employed.

The operation may be readily understood. Each of the advertising frames carries a flexible sheet 9 (Fig. 5) upon both sides of which signs are painted. These are reversed in respect to each other so that when the frame becomes inverted after transportation from front to rear of the cabinet, the reverse or inverted sign originally in back will be in the proper upright position when the frame ultimately comes to the front of the cabinet.

The foregoing transportation of the foremost frame from front to rear of the cabinet is accomplished by moving said frame downwardly at the front, curling it under (so to speak) then moving it upward to the final resting position at the back of the series of frames which the cabinet carries. This particular mode of transportation requires a frame of flexible quality, and this quality is supplied by the flexible side straps 7 which connect the rigid metallic strips 5 and 6 which define the horizontal borders of the frame. The flexible sheet 9 is suitably attached both to the rigid borders and to the flexible side straps, the whole arrangement being well adapted to the intended purpose.

Assume that a number of the advertising frames are mounted upon the end supports 15 by virtue of the rest afforded by the upper pin ends 12. The frames hang in place in the cabinet upon the end supports, but the lower ends of the frames do not swing free because the springs 69 (Figs. 2, 3 and 4) press forward upon the lower ends as shown. Springs 68 bear upon the surfaces of the rollers 67 (Fig. 6) and exert pressure upon the side straps 7 of the frames as they move around to the rear. Similarly, springs 44 press down upon the frames from the rear to aid in keeping them in place.

Upon closing the motor circuit 60—61 (Fig. 12) by closing the switch 62 continuous operation of the apparatus commences.

The shaft 64 is driven by the motor but serves as the driving shaft for the endless chains 27. Each of these chains carries a pair of lugs, namely the lifter lug 26 and the presser lug 39. Displacement of the foremost frame necessarily precedes the transportation thereof from front to rear of the cabinet. The first act occurs when the lug 26 engages the end 25 of the lever 24 (Fig. 3).

Rocking of the lever 24 by continued downward movement of the lug 26 causes upward movement of the lifter plunger 16 so that the point 18 is thrust between the pin ends 12 of the first two frames (see Figs. 3 and 7) whereupon the bevel or cam 17 causes the foremost frame to ride over the lug 19, down the incline 20 and into engagement with the chain 27. However, the displaced foremost frame cannot drop for the reasons that the pin end 12 is held by the chain and the flexible strap 7 (or what is the equivalent thereof) the adjacent front surface of the flexible sheet 9 comes into contact with and is restrained by the friction strip 35.

While this is going on the lower pin end 13 of the foremost frame takes a corresponding drop. As soon as the lug 26 passes beyond the end 25 of the lever 24 it comes into engagement with the pin end 13 at the lower end of the foremost frame. Continued downward pressure of the lug carries the pin end 13 past the deflector 34 and toward a pocket presently to be formed between the concavaties 32 and 33 of the chain and lower sprocket 31 respectively. The same downward pressure causes displacement of the movable contact 53 so that the lighting circuit is opened.

Although the pin end 13 is carried around in the pocket mentioned, the lifter lug 26 still bears upon the pin end until said end is finally delivered to the support 15 at the back of the frame series. The frame is now inverted, but the formerly inverted sign at the rear is now in the upright position, ready for display when the now rearmost frame is ultimately worked to the front. The upper pin end 12 is sustained by the pocket afforded between the concavity 27 of one of the chain links and the surface of the adjacent sheathing 14 (Fig. 9). The latter pocket provides the support for the upper end of the frame during transportation.

As soon as the lower pin end 13 travels rearwardly far enough it must of necessity depart from the former pocket. The continued pressure of the lug 26 now serves to lift the rearmost end of the frame. The fixed deflector 42 insures that the pin end 13 shall remain in place upon the lug after departure from the pocket. The incline 43 (Fig. 8) insures that the pin end shall be directed into the chain track. The lug 26 continues lifting the frame, the upper pin end 12 in the meantime having been pocketed between concavities 32 and 33 of the chain and lower sprocket in the manner identical with that described in connection with the pin end 13.

As soon as the frame has been lifted high enough, it is dropped upon the support 15. The spring 44 guides the pin end into place and at the same time presses down upon the edge of the frame. The presser lug 39 presently comes into engagement with the trip 38 (Figs. 2 and 7) causing forward movement of the presser lever 36 so that the heel 40 pushes the frames forwardly. The pin ends of the foremost frame are made to ride over the lug 21 so that the pin ends recline in the recess 22 between the pair of lugs 19 and 21 in readiness to be displaced by the plunger 16 in the manner already described.

Illumination of the foremost sign by means of the lamps 48 ceases when displacement of the foremost frame occurs. The resulting displacement of the movable contact 53 opens the lighting circuit 50, 51 (Fig. 12), but as soon as the uppermost border of the frame undergoing transportation passes the movable contact 53 the latter is permitted to snap back to the original position whereupon the lighting circuit is again closed, causing lighting of the lamps and illumination of the sign on the frame next succeeding. The entire apparatus is stopped by opening the master switch 58.

A clock is mounted upon the glass front 70. The works of this clock are very small, and either the clockwork case nor the hands will obscure the illuminated sign to any appreciable extent. The clock numerals are painted or otherwise applied directly to the glass. The use of the clock is in line with the advertising character of the apparatus and while it is herein disclosed has nothing to do with the apparatus itself.

While the construction and arrangement of the improved apparatus are that of a generally preferred form, obviously modifications and changes may be made without departing from the spirit of the invention or the scope of the claims.

We claim:—

1. Apparatus of the character described comprising a series of frames carrying display matter on each side the matter on one side being inverted in respect to that on the other, each frame being composed of pairs of parallel rigid strips terminating in pin ends and parallel flexible straps connecting the strips, fixed supports upon which the pin ends of one of each pair of strips rest sustaining the frames in a hanging position, means moving upward behind the resting pin ends of the foremost frame displacing them and the frame from said supports, means engaging the pin ends of both strips, transporting the displaced frame to a position in back of the series when the formerly inverted matter assumes the upright position, and periodically acting means engaging the pin ends of one of the strips of the arriving frame to push them and the other frames of the series forwardly upon said supports in readiness for a displacement of the then foremost frame.

2. Apparatus of the character described, comprising a plurality of sign-carrying frames having rigid upper and lower strips terminating in pin ends and flexible connecting side straps permitting bending of the frames in one direction, supports upon which the upper pin ends rest to sustain the frames in hanging positions, means to displace the foremost frame from said supports, continuously moving means engaging the pin ends on the upper and lower strips of the foremost frame to transport said frame from front to rear of the series, said side straps permitting bending during transportation, means to direct the formerly lowermost pin ends and now uppermost pin ends upon said supports, means to push against the newly arrived frame and press the entire series forwardly, and means upon said support defining recesses into which the upper pin ends of the foremost frame are pushed spacing the foremost frame from the frame next succeeding a distance slightly greater than the space existing between the remaining frames, thereby facilitating the entrance of said displacing means.

3. Apparatus of the character described comprising a plurality of sign-carrying frames, supports upon which the series of frames rest in hanging positions, continuously moving means having lifter and presser lugs, a lifter plunger operable by the lifter lug to displace the foremost frame from its supports and subsequently exerting pressure upon the displaced frame to assist in transporting it from front to rear of the series, means guiding the displaced frame upon the supports upon arrival of the same at the rear of the series, and a presser lever operable by the presser lug to push the newly arrived frame and those in front of it to the front of the supports in readiness for the next displacement.

4. Apparatus of the character described comprising a sign-carrying frame including a cross strip having pin ends, fixed supports upon which the pin ends rest to sustain the frame in the hanging position, said supports including upright portions forming a track, transporting means moving in said track and in reference to said supports, a plunger movable beside the pin ends for displacing said frame from the supports so that the pin ends enter the track where they are engaged between said upright portions and said continuously moving means and means for pushing said frames across the track so that they can be acted upon by said plunger.

5. Apparatus of the character described comprising a sign-carrying frame having a strip provided with pin ends, supports upon which the pin ends rest to sustain the frame in the hanging position, said supports including an upright portion, a complementary cleat spaced from said upright portion and forming a track in said space, transporting means moving continuously in said track, and means for displacing the frame from said supports so that they enter said track for the transportation of the frame, said pin ends being engaged between said upright portions and one side of the continuously moving means, the opposite side of said means moving against and being limited by the adjacent cleat.

6. Apparatus of the character described comprising a frame having parallel strips with pin ends, flexible straps connecting the strips, supports upon which the pin ends of the upper strip rest to sustain the frame in a hanging position, upright portions forming part of the supports serving as portions of tracks, transporting means continuously moving beside said portions, means to displace the frame from said supports so that the upper pin ends come into engagement with said continuously moving means and said upright portions for transportation of the frame, and friction means so disposed in respect to the transporting means and said upright portions to engage the flexible straps and prevent falling of the frame.

7. Apparatus of the character described comprising a frame having upper and lower pin ends, supports upon which the upper pin ends rest, said supports having portions on opposite sides providing portions of front and rear tracks, transporting means continuously moving in said tracks adjacent to said portions, revoluble means adjacent to the top and bottom of the frame over which the transporting means runs, means to displace the frame from said supports, said supports having inclines guiding the upper pin ends toward the adjacent movable means for engagement with said means and the adjacent track portion, guide means adjacent to the lower pin ends deflecting them toward said movable means to be pocketed therebetween and said lower revoluble means while transporting the frame to the other side of the supports, and an incline at the approach to the track on said other side insuring that the lower pin ends shall be guided into the tracks.

8. Apparatus of the character described comprising a plurality of sign-carrying frames, supports upon which the frames rest in hanging positions, and a plunger projectible between a pair of the frames to displace one of the frames from said supports.

9. Apparatus of the character described comprising a plurality of sign-carrying frames which include projecting pin ends, supports upon which the pin ends rest to sustain the frames in hanging positions, and a plunger projectible between the pin ends of a pair of the frames to displace the pin ends of one of the frames from the supports.

10. Apparatus of the character described comprising a plurality of sign-carrying frames which include projecting pin ends, supports receiving the pin ends to sustain the frames, lugs formed on the supports to prevent accidental slipping off of the frame nearest to a point of departure of the frames from the supports, and a plunger formed to constitute a cam being projectible between a pair of the frames to force the pin ends of the last frame over the lugs.

11. Apparatus of the character described comprising a plurality of frames which have projecting pin ends, supports for the pin ends including lugs adjacent to a point of departure of the frames from the supports, and recesses adjacent to the lugs in which the pin ends of one of the frames incline, and a plunger projectible between a pair of frames to displace the pin ends of said one frame from the recesses and force them over the lugs.

12. Apparatus of the character described comprising a plurality of frames which have pin ends, supports receiving the pin ends having lugs to prevent accidental slipping off of an outermost frame, recesses adjacent to said lugs, said recesses having adjoining slightly raised places producing a space between the frame having pin ends reclining in the recesses and an adjacent frame, and a plunger projectible into the space to dislodge pin ends from the recess and force them over the lugs.

13. Apparatus of the character described comprising a frame having pin ends and side straps, supports upon which the pin ends recline and from which they are displaceable, means forming tracks adjacent to the supports to receive the pin ends when displaced, and friction strips against which said straps rub to prevent idle falling of the frame when the pin ends are displaced.

14. Apparatus of the character described comprising a frame having pin ends and side straps, supports upon which the pin ends rest and from which they are displaceable, means forming tracks adjacent to the displacing point of the supports, carrier chains having strands movable with the end tracks, being packed against one side of the tracks when conveying the displaced pin ends which ride against the opposite side of the tracks, and the friction strips adjoining the displacing point of the supports against which the straps rub preventing idle falling of the frame until said displaced pin ends are caught by the links of the chains.

15. In advertising apparatus, a plurality of sign frames, a support upon which the frames rest, and a plunger having a cam at the side of one end, being projectible between a pair of frames to displace one of the frames by said cam and retain the rest of the frames upon the support.

OLLIE W. KNIGHT.
JOSEPH B. WESLEY.